UNITED STATES PATENT OFFICE.

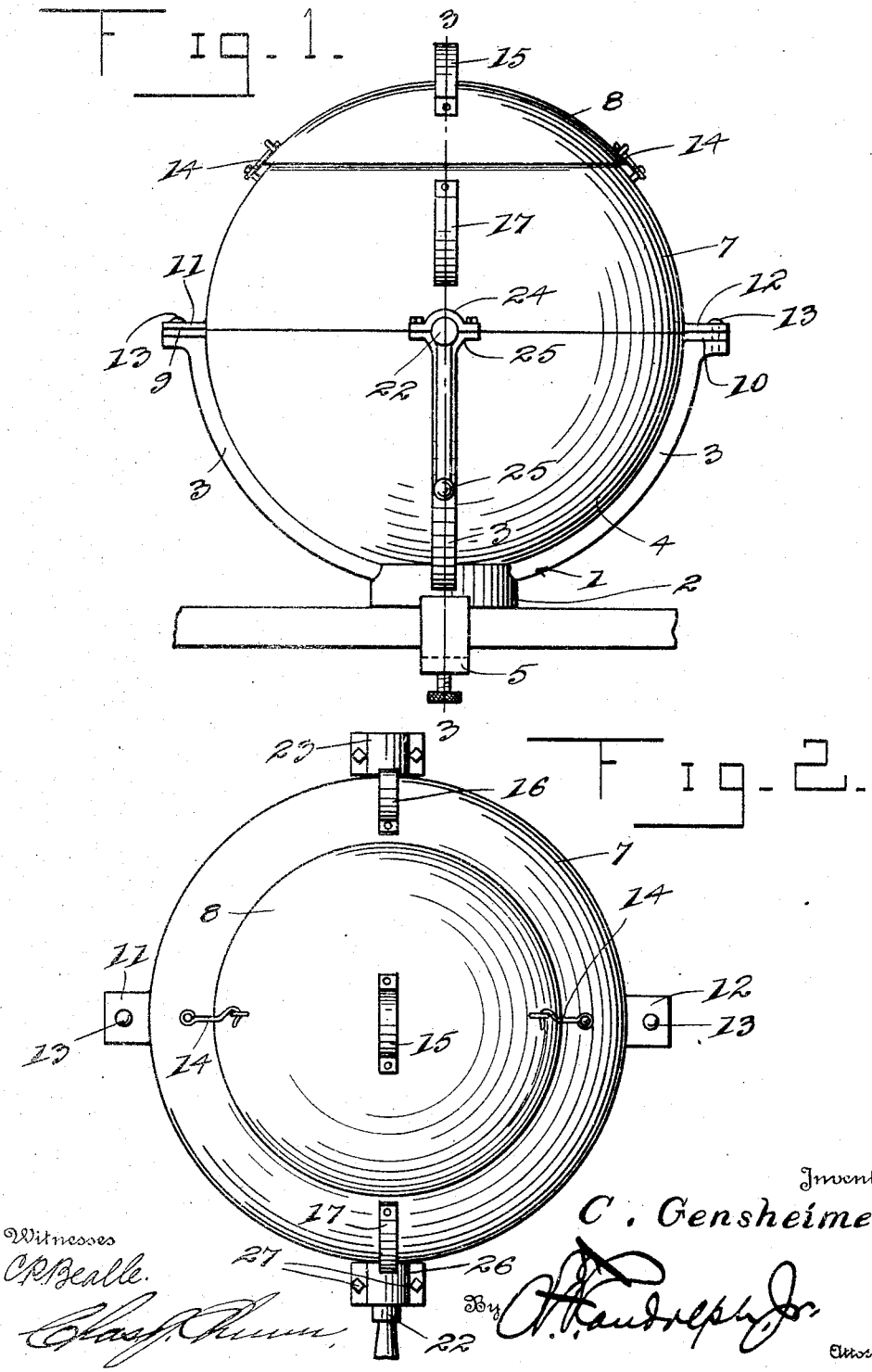

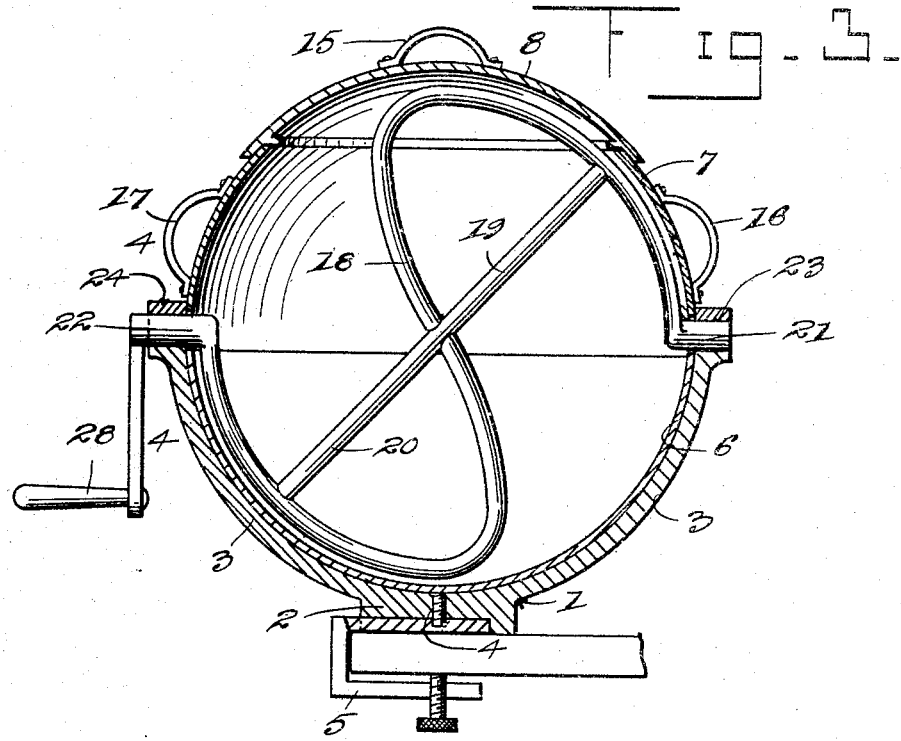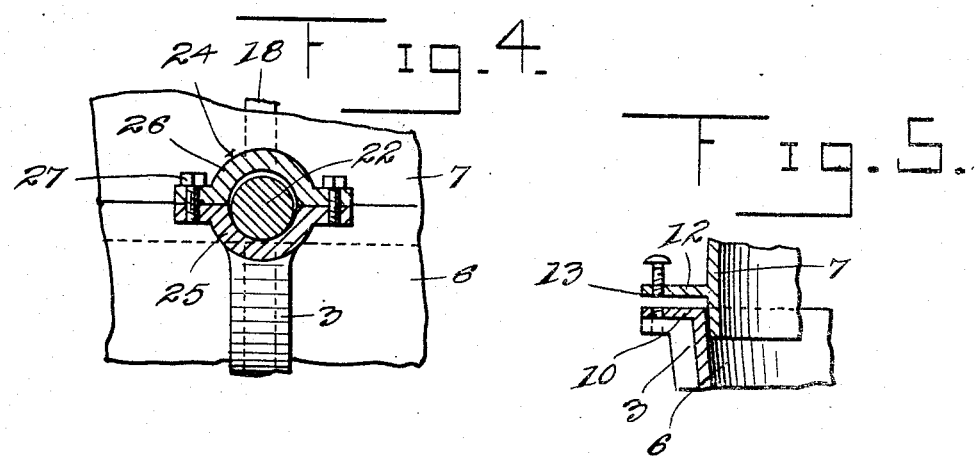

CHARLES GENSHEIMER, OF PHILADELPHIA, PENNSYLVANIA.

BREAD-MIXER.

1,229,934. Specification of Letters Patent. Patented June 12, 1917.

Application filed December 13, 1913. Serial No. 806,509.

*To all whom it may concern:*

Be it known that I, CHARLES GENSHEIMER, a citizen of the United States, residing at Frankford, Philadelphia, in the county of Philadelphia and State of Pennsylvania, have invented certain new and useful Improvements in Bread-Mixers; and I do hereby declare the following to be a full, clear, and exact description of the invention, such as will enable others skilled in the art to which it appertains to make and use the same.

My invention relates to new and useful improvements in bread mixers and resides in the provision of a mixer which will enable a reliable and expeditious mixing of dough in a shorter time than is necessary by hand.

An important object of my invention is to provide a device of the character described which may be readily clamped upon the edge of a table or like support and easily operated to mix a batter or dough in an efficient and expeditious manner, so that contact of the hands with the batter or dough is not necessary and a better kneading or working of the dough is provided.

Another important object of my invention is to provide a simple inexpensive device of the character described which consists of a spherical chamber composed of three sections and supported by a novel form of supporting means, said chamber being capable of being readily assembled or disassembled and adapted to have journaled therein a mixing member of a novel form which serves to provide a better working or mixing of the dough than has been had heretofore.

This invention further aims to improve mixers of the character described so as to render them more practical, light, strong and durable, reliable and efficient in operation, more expeditious in operation and more cheap to manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts.

Figure 1 is a side elevation of the device in assembled position and showing it attached to the edge of a table or support, Fig. 2 is a top plan view, Fig. 3 is a vertical sectional view taken on line 3—3 of Fig. 1, illustrating the device as it would appear in assembled position and showing the specific construction of the mixing or kneading member within the spherical chamber, Fig. 4 is a vertical sectional view taken on line 4—4 of Fig. 3 showing the manner of journaling the mixing member relative to the supporting means and spherical chamber, and Fig. 5 is a detail sectional view of the joint employed for securing the main sections of the spherical chamber.

Referring particularly to the drawings forming a part of this specification and in which like characters of reference are employed to designate corresponding parts, the numeral 1 designates as an entirety a skeleton supporting frame which is preferably constructed of some suitable light metal and is adapted to support the spherical chamber which will be later more fully described. The supporting frame 1 consists of a base member 2 and four integrally formed upwardly extending curved spaced supporting arms designated 3. The supporting arms 3 are adapted to be detachably secured to the spherical chamber. Secured by means of a screw 4 or some other suitable fastening means to the base portion 2 of the frame 1 is a clamp 5 of the screw type that is adapted to be fitted about the edge of a table or suitable support.

The spherical chamber consists of a main or bottom section 6 which is approximately semi-spherical, an intermediate section 7 and a cap or top section 8. These sections 6, 7 and 8 when fitted together form a spherical chamber such as above described. The bottom or main semi-spherical chamber 6 is adapted to be supported by the supporting arms 3 which are curved to conform to the contour of the member 6. Diametrically opposed securing flanges 9 and 10 are formed on the upper edge of the member 6 and disposed at right angles thereto. These flanges 9 and 10 are adapted to lie flat upon the upper ends of certain of the opposed supporting arms 3, and are centrally apertured for a purpose which will be later more fully described.

The intermediate section 7 is provided at a point spaced from its lower edge upon opposite sides with securing flanges 11 and 12 that are arranged similarly to the flanges 9 and 10 and adapted to lie flat in engagement therewith so that the lower edge of the member 7 is disposed below the upper edge of the member 6, that is, in overlapping engagement therewith. Bolts or other suitable fastening means 13 is inserted through each of the flanges on the members 6 and 7 and have threaded engagement with the upper ends of the opposed arms 3, hereinbefore described.

It will thus be seen that the sections 6 and 7 are securely held in proper position relative to each other in the supporting frame 1.

The top section 8 is adapted for overlapping engagement with the upper portion of the intermediate section 7 and is secured in that position by a hook and eye connection 14. The hooks and eyes being preferably arranged in diametrically opposed relation to each other on the sides of the members 7 and 8. The top section 8 is preferably provided upon its inner face in spaced relation to its lower edge with an annular flange of approximately the same thickness as the section 7 and adapted for engagement with the upper edge of the section 7, thus serving to provide a rigid connection for the sections 7 and 8. A handle member 15 is preferably secured to the outer surface of the member 8 approximately centrally thereof. Handle members 16 and 17 are preferably secured to the intermediate section 7 upon opposite sides thereof. It will thus be seen that provision for the placing of the members 7 and 8 into proper position prior to the securing thereof is provided as well as the provision for the ready removal thereof.

Rotatably journaled in the spherical chamber formed of the sections, 6, 7, and 8 as hereinbefore described, is a substantially S-shaped kneader or beater 18 that is braced intermediate its ends by integral brace rods 19 and 20. The ends of the S-shaped kneader 18 are provided with trunnions 21 and 22. The trunnion 21 is journaled in an enlarged bearing 23 on the upper end of one of the supporting arms 3 and the trunnion 22 is journaled in a bearing 24 on the upper end of the arm 3, that is, in diametrically opposed relation to the arm provided with a bearing 23. The bearing 24 consists of an integral bearing plate 25 on the supporting arm 3 and a detachable plate 26 adapted for coöperation with the fixed plate 25 and to be secured thereto by means of bolts 27 or other suitable fastening means.

It will thus be seen that provision for the ready assembling or disassembling of the device is had by means of the arrangement of the bearing member 24 hereinbefore described. The trunnion 22 is extended beyond the outer face of the bearing member 24 and has formed integral therewith a crank handle 28. The member 18 is arranged to be slightly spaced from the inner surface of the members 7 and 8 when in assembled position and it will be readily seen that upon the rotation or oscillation of the member 18 the dough or batter is readily mixed or kneaded.

The top section 8 may be removed and the opening provided by its removal is adapted to facilitate the placing of a standard form of flour sieve so that suitable flour may be mixed while the kneading operation is taking place.

It will be apparent with reference to the foregoing description and accompanying drawings that there has been provided a mixing device which is capable of performing all the functions hereinbefore recited in a reliable and expeditious manner. Further, it will be noted that in providing the removable sections forming the spherical chamber, access will be had to the interior of the chamber and the device may be readily assembled or disassembled.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

In a bread mixer, the combination with a supporting frame having a base portion and a plurality of spaced arms radiating from said base and curved upwardly therefrom, said base portions having a rounded depression in its upper surface, said spaced arms having horizontally disposed terminals, of a spherical mixing chamber fitted snugly within the depression in said base and upwardly curved arms, said mixing chamber comprising a bottom semi-spherical section, a pair of oppositely disposed lugs on the upper edge of the section adapted to engage certain of the horizontally disposed terminals of the opposed supporting arms, and an intermediate section having a pair of oppositely disposed lugs thereon in spaced relation to the lower edge thereof and adapted to engage the lugs and the bottom section, a mixing member mounted within the spherical chamber and rotatably journaled in certain other of the opposed supporting arms, and securing means inserted through the lugs on the bottom and intermediate sections and the horizontally disposed terminals of the supporting arms, whereby said sections are securely fastened together and to said supporting frame.

In testimony whereof I affix my signature in presence of two witnesses.

CHARLES GENSHEIMER.

Witnesses:
THOMAS F. HOGAN,
EMILY GENSHEIMER.